Nov. 14, 1961     H. O. MEUCHE     3,008,245
EDUCATIONAL KIT FOR INSTRUCTION AND TESTING
OF ELECTRICAL CIRCUITS

Filed Oct. 12, 1960     2 Sheets-Sheet 1

INVENTOR.
HOWARD O. MEUCHE
BY
ATTORNEY

Nov. 14, 1961 H. O. MEUCHE 3,008,245
EDUCATIONAL KIT FOR INSTRUCTION AND TESTING
OF ELECTRICAL CIRCUITS
Filed Oct. 12, 1960 2 Sheets-Sheet 2
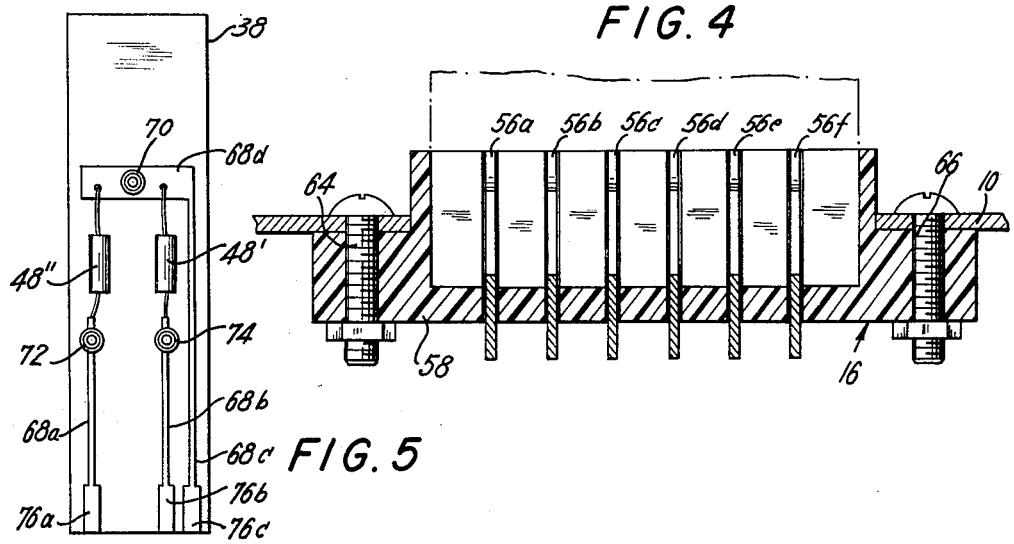
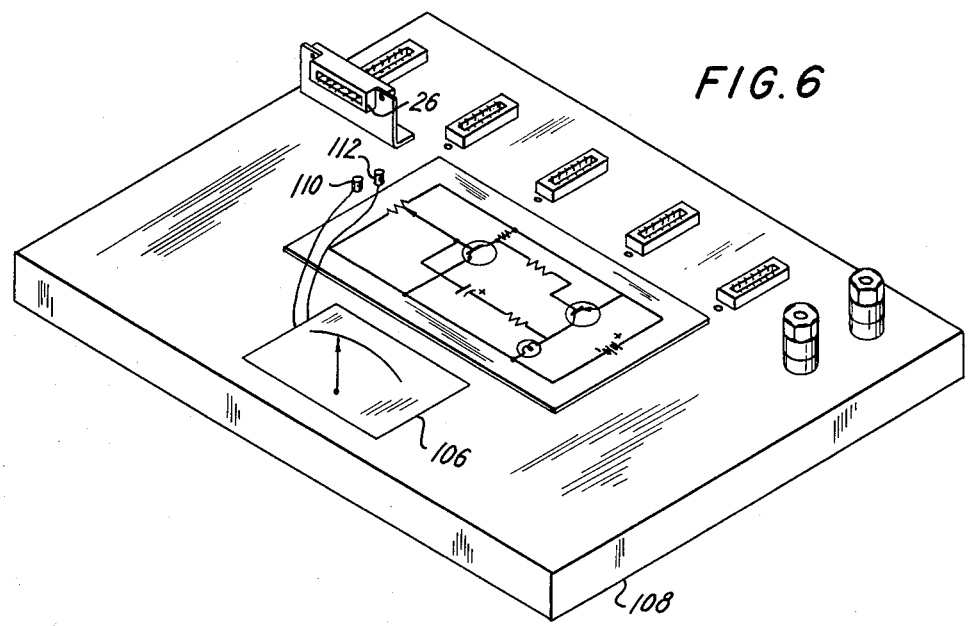
INVENTOR.
HOWARD O. MEUCHE
BY
ATTORNEY

1

United States Patent Office 3,008,245
Patented Nov. 14, 1961

3,008,245
EDUCATIONAL KIT FOR INSTRUCTION AND TESTING OF ELECTRICAL CIRCUITS
Howard O. Meuche, R.R. 1, Fort Branch, Ind.
Filed Oct. 12, 1960, Ser. No. 62,256
5 Claims. (Cl. 35—19)

This invention relates to educational kits, and more particularly to apparatus which facilitates display, instruction and testing with respect to electrical circuits.

It is an object of the invention to provide improved apparatus of the above-indicated type which consists of easily stored components and which is readily and economically manufactured.

It is another object of the invention to provide improved pedagogical techniques for facilitating the comprehension of electrical circuit connections and operation.

Still another object of the invention is to provide for the physical removal of an electrical circuit section for testing and other purposes while maintaining the section as an integral part of the associated circuit.

A further object of the invention is to provide an improved kit which is readily adapted for universal use with a plurality of circuits which are to be studied.

Briefly, in achieving the above and other of its objectives, the invention, in one form thereof, contemplates the use of a base member wherein is provided a plurality of sockets including contacts in like geometrical arrangement, there being further provided plates which are adapted for insertion into these sockets. On these plates are arranged electrical elements which constitute the circuit to be studied and the contacts are so connected that the plates can be interchangeably accommodated in the sockets while constituting the aforesaid circuit. Finally, means is provided for supporting the sockets such that at least one of the sockets is particularly located to facilitate testing, inspection and so forth, so that these operations can be performed while the circuit is operative but with the tested section being fully displayed.

Other objects, as well as features and advantages of the invention, will become apparent from the following detailed description of some preferred embodiments as illustrated in the accompanying drawing in which:

FIG. 4 illustrates the construction of a socket employed in the apparatus of FIG. 1;

FIG. 5 illustrates a component of the apparatus of FIG. 1; and

FIG. 6 illustrates a slightly modified educational kit provided in accordance with the invention.

Figure 1:
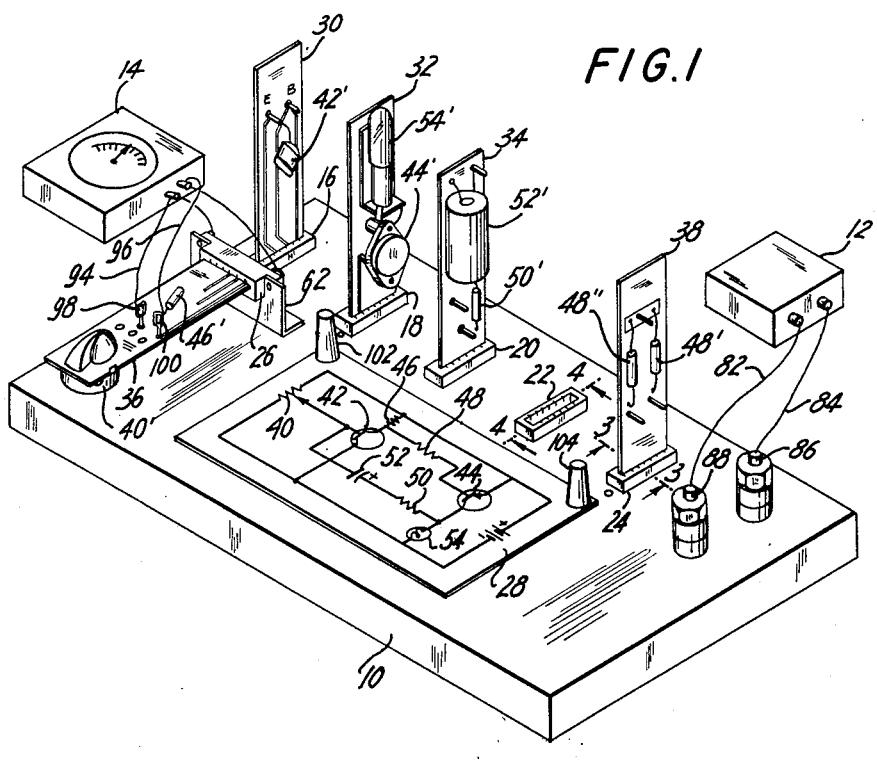
FIG. 1 is a perspective view illustrating an educational kit in accordance with one embodiment of the invention.

The educational kit illustrated in FIGS. 1–5 comprises, as is shown in FIG. 1, a base member 10, a source of electrical power 12, a meter 14, sockets 16, 18, 20, 22 and 24, display socket 26, schematic diagram 28 and plates or circuit sections 30, 32, 34, 36 and 38.

The circuit represented by schematic diagram 28 consists of a number of electrical or electronic components which are distributed among and supported on the plates 30–38.

For example, schematic drawing 28 illustrates a potentiometer 40, transistors 42 and 44, resistors 46, 48 and 50, capacitor 52 and load lamp 54. These electrical components which are schematically represented in diagram 28 are to be found as indicated above on the plates 30–38. Thus, on plate 30 is mounted transistor 42', while on plate 30 is mounted load lamp 54' and transistor 44', these components finding their schematic equivalents in diagram 28. Further, on plate 30 will be found capacitator 52' and resistor 50', whereas on plate 36 is to be found potentiometer 40' and resistor 46'. Finally, on plate 38 will be found resistors 48' and 48", the resistor 48 of diagram 28 being broken up into two smaller resistors 48' and 48" for purposes of testing.

Figure 3:
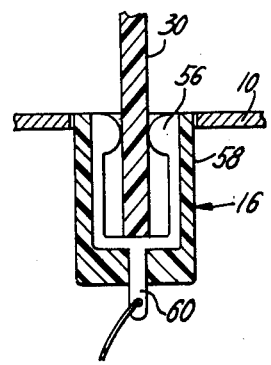
FIG. 3 illustrates a detail of the apparatus of FIG. 1.

The structure of sockets 16–26 is shown in FIGS. 3 and 4. In FIG. 3 is shown, by way of example, a cross-section of socket 16 illustrating therein one of the contacts 56 housed in a generally rectangular body 58 of plastic or like insulating material. Contact 56 is in the form of a clamp of, for example, beryllium copper or like resilient material, adapted to accommodate and hold, for example, the plate 30. Contact 56 is provided with a downwardly extending lug 60 with which electrical contact can be made, as will be indicated hereinafter. Each of sockets 16–24 is located in base member 10 so as to open upwardly, whereby the associated plate can be held in vertical disposition, as illustrated in FIG. 1. Socket 26, however, is vertically disposed and held in position by a flange 62 (FIG. 1) so that the plate inserted therein is held in horizontal disposition to facilitate displaying, testing and instruction, as will become apparent hereinafter.

FIG. 4 illustrates a longitudinal section of the socket 16 wherein are shown a plurality of contacts 56a—56f. These contacts are in rectilinear array, this geometrical pattern being similar or identical in all of the sockets.

FIG. 4 further illustrates that the body 58 of the sockets is maintained in position on the base member 10 by means of nut and bolt assemblies 64 and 66.

FIG. 5 illustrates plate 38, by way of example. This plate, which is preferably right quadrilateral or rectangular in shape is made of a plastic or other insulating material of sufficient thickness to enable same to be clamped firmly by the clamps of the associated socket. The particular plate illustrated in FIG. 5 has mounted thereon, by soldering or otherwise, the resistors 48' and 48". Directly applied to the plate are a number of conductive elements 68a—68d which can be copper films applied by printed circuit techniques or the like. Resistors 48' and 48" are connected at one end thereof to conductive element 68d, there being a post 70 mounted on plate 38 in such a manner as to have electrical connection with element 68d.

At the other ends, resistors 48' and 48" are respectively connected to conductive elements 68b and 68a, to which are connected posts 72 and 74 which are also mounted on the plate 38.

Finally, to enable a voltage to be applied to conductive element 68d, this element is connected to conductive element 68c.

Conductive elements 68a—68c are each provided with terminal portions 76a—76c which are adapted to engage and be engaged by the contacts of the associated socket. These terminal portions, as well as the other terminal portions, have a geometrical relationship with each other and with the end of the associated plate in order to enable the same to make selective contact with predetermined clamps in any one of the sockets.

In other words, assigning the clamps or contacts of the sockets of the illustrated educational kit a numerical sequence, the terminal portions of the conductive elements of any given plate will contact the same sequence of clamps or contacts in each and every one of the sockets thereby making the plates positionally interchangeable with one another while maintaining the corresponding electrical circuit, as will become apparent hereinafter. This finds particular importance with respect to socket 26 since any one of the plates supported in sockets 16–24 can be arbitrarily removed therefrom and placed into socket 26 whereat it will contact the same sequential order of contacts or clamps.

Figure 2:
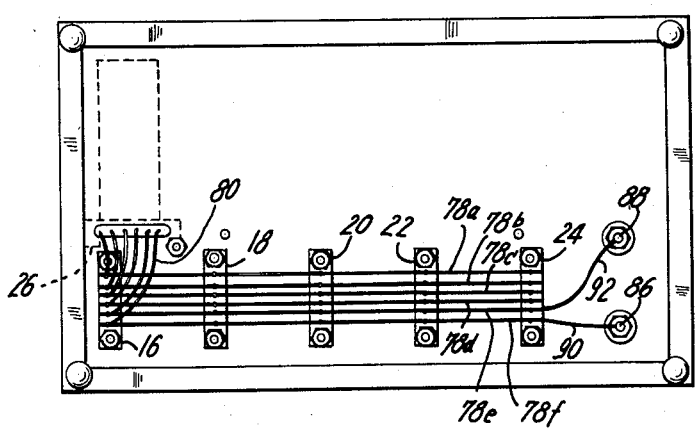
FIG. 2 is a bottom plan view of the main section of the kit illustrated in FIG. 1.

With reference to FIG. 2, it will now be seen that conductors 78a–78f are employed to connect contacts of the sockets 16–24 which are of like numerical sequences or which have like rank in the geometrical pattern referred to above. Since the sockets and the contacts are rectilinearly aligned, the conductors 78 can be simple straight rods or wires.

At the same time, the correspondence of sequence is maintained with respect to socket 26, the contacts of which are connected to conductors 78 by means of conductors 80. This insures the interchangeability of the various plates among all of the sockets mounted on base member 10.

Power source 12 also finds its equivalent in schematic diagram 28. It is connected via lines 82 and 84 to terminals 86 and 88 which, in turn (see FIG. 2), are connected via lines 90 and 92 to conductors 78e and 78f (arbitrarily chosen for purposes of explanation).

Meter 14 is provided with lines 94 and 96 terminating in caps or clips 98 and 100 which are adapted to engage the posts on the plate mounted in socket 26.

Means are provided including fastening elements 102 and 104 for holding schematic diagram 28 in position on base member 10 for visual inspection.

Diagram 28 and the associated plates 30–38 represent one of a plurality of circuits finding utility in connection with base member 10, for it is intended that other schematic diagrams be provided with plates which are insertable in similar manner in the illustrated sockets.

It will be appreciated that a plurality of electrical circuits can each be divided into sections between which, in order to connect the sections to reconstitute the associated circuit, are required a like number of connections for each circuit. This required number of connections determines the number of conductors 78 which will be necessary. If one of the circuits requires a larger number of connections between its sections, provision will have to be made based upon this particular circuit.

Assuming that none of the circuits has more than $x$ sections, the base member 10 will be provided with $x+1$ sockets, one of these sockets being a horizontally disposed socket equivalent to socket 26 in FIG. 1. Each socket will be provided with $n$ contacts, $n$ being the maximum number of connections provided between the sections of a circuit.

The electrical components of the different circuits will be distributed among and supported on the plates constituting the sections of the associated circuit.

In operation, a schematic diagram circuit will be held in position by means 102 and 104 and the associated plates will be vertically disposed in sockets 16–24. To examine, study and make measurements on any one section of the circuit, the associated plate will be removed from its socket and replaced in the horizontal circuit 26. Electrical connections will be maintained by means of conductors 78 and by reason of the corresponding alignment of the different contacts, the function of the overall circuit will not be disturbed. Examination and measurement of the electrical connections of the horizontally disposed section is facilitated by the provision of posts on the associated plate to provide for electrical connection of the meter 14.

In a slightly modified embodiment of the invention (FIG. 6), meter 14 is replaced by a meter 106 which is mounted in the base member 108 which replaces base member 10 of FIG. 1. Meter 106 may have connection with posts 110 and 112, to which are fixed flexible leads (not shown) and, alternatively, meter 106 can be connected with a selector switch (not shown) which enables connection to any one of the conductors leading to the contacts of horizontally disposed circuit 26.

Since the plates of the above-indicated apparatus are all of like shape and size, they are readily stored. Similarly, the shape of these plates, as well as the construction and arrangement of the sockets, permits the apparatus of the invention to be readily and economically manufactured.

The technique provided of enabling a section of a circuit to be demounted and visually isolated while maintaining the same electrically in the associated circuit constitutes an improved pedagogical technique which facilitates the comprehension of electrical theory and principle related thereto.

There will now be obvious to those skilled in the art many modifications and variations of the structure set forth above. These modifications and variations will not, however, depart from the scope of the invention if defined by the following claims.

What is claimed is:

1. An educational device comprising a base member, a plurality of sockets in said base member, a plurality of contacts in each of said sockets, a plurality of conductors connecting the contacts of the different sockets, a plurality of plates of insulating material, said sockets having vertically disposed openings to receive the plates and hold the same immovably in substantially vertical position, electrical elements constituting the components of an electrical circuit distributed among and mounted on said plates, conductor elements on said plates, said conductor elements being connected to said electrical elements and having, on each of said plates, a predetermined alignment whereby selective engagement results with the contacts in said sockets so that the elements can be properly connected in said electrical circuit, a display socket, contacts in said display socket, said display socket having a horizontally disposed opening to accommodate any one of said plates to isolate the same in horizontal position, the contacts of said display socket being connected with said conductors so as to maintain the electrical elements of the plates in proper connection when the latter are supported in said display socket, electrically conductive posts on said plates and electrically coupled to said electrical elements, and a meter adapted for connection to said posts.

2. An educational device comprising a base member, a plurality of sockets in said base member, a plurality of contacts in each of said sockets, a plurality of conductors connecting the contacts of the different sockets, a plurality of plates of insulating material, said sockets having vertically disposed openings to receive the plates and hold the same immovably in substantially vertical position, electrical elements constituting the components of an electrical circuit distributed among and mounted on said plates, conductor elements on said plates, said conductor elements being connected to said electrical elements and having, on each of said plates, a predetermined alignment whereby selective engagement results with the contacts in said sockets so that the elements can be properly connected in said electrical circuit, a display socket, contacts in said display socket, said display socket having a horizontally disposed opening to accommodate any one of said plates to isolate the same in horizontal position, the contacts of said display socket being connected with said conductors so as to maintain the electrical elements of the plates in proper connection when the latter are supported in said display socket, electrically conductive posts on said plates and electrically coupled to said electrical elements, and a meter adapted for connection to said posts, said meter being mounted on said base member.

3. An educational device comprising a base member, a plurality of sockets in said base member, a plurality of contacts in each of said sockets, a plurality of conductors connecting the contacts of the different sockets, a plurality of plates of insulating material, said sockets having openings to receive the plates and hold the same, electrical elements constituting the components of an electrical circuit distributed among and mounted on said plates, conductor elements on said plates, said conductor elements being connected to said electrical elements and having, on each of said plates, a predetermined alignment whereby selective engagement results with the contacts in said sockets so that the elements can be properly connected in said electrical circuit, a display socket, contacts in said display socket, said display socket having an opening spaced from the first said openings and adapted to accommodate any one of said plates to isolate the same from the other of said plates, the contacts of said display socket being connected with said conductors so as to maintain the electrical elements of the plates in proper connection when the latter are selectively supported in said display socket, electrically conductive posts on said plates and electrically coupled to said electrical elements, and a meter adapted for connection to said posts.

4. An educational device comprising a base member, a plurality of sockets in said base member, a plurality of contacts in each of said sockets, a plurality of conductors connecting the contacts of the different sockets, a plurality of plates of insulating material, said sockets having openings to receive the plates and hold the same, electrical elements constituting the components of an electrical circuit distributed among and mounted on said plates, conductor elements on said plates, said conductor elements being connected to said electrical elements and having, on each of said plates, a predetermined alignment whereby selective engagement results with the contacts in said sockets so that the elements can be properly connected in said electrical circuit, a display socket, contacts in said display socket, said display socket having an opening spaced from the first said openings to accommodate any one of said plates to isolate the same from the other of said plates, the contacts of said display socket being connected with said conductors so as to maintain the electrical elements of the plates in proper connection when the latter are supported in said display socket, and means to indicate electrical conditions of the electrical elements on the plates accommodated in said display socket.

5. An educational device comprising a base member, a plurality of sockets in said base member, a plurality of contacts in each of said sockets, a plurality of conductors connecting the contacts of said sockets, a plurality of plates of insulating material, said sockets having openings to receive the plates and hold the same, electrical elements constituting the components of an electrical circuit distributed among and mounted on said plates, conductor elements on said plates, said conductor elements being connected to said electrical elements and having, on each of said plates, a predetermined alignment whereby selective engagement results with the contacts in said sockets so that the elements are connected in said electrical circuit, a display socket, contacts in said display socket, said display socket having an opening to accommodate one of said plates selectively to isolate the same from the other of said plates, the contacts of said display socket being connected with said conductors so as to maintain the electrical elements of the plates in proper connection when the latter are supported in said display socket, and means to indicate electrical conditions of the electrical elements on the plates accommodated in said display socket.

References Cited in the file of this patent

UNITED STATES PATENTS

| | | |
|---|---|---|
| 2,592,552 | De Florez et al. | Apr. 15, 1952 |
| 2,788,470 | Giel et al. | Apr. 9, 1957 |
| 2,832,013 | Pedersen et al. | Apr. 22, 1958 |
| 2,857,558 | Fiske | Oct. 21, 1958 |
| 2,904,768 | Rasmussen | Sept. 15, 1959 |
| 2,925,537 | Winkler | Feb. 16, 1960 |
| 2,951,185 | Buck | Aug. 30, 1960 |